United States Patent [19]
Takahashi

[11] Patent Number: 5,343,268
[45] Date of Patent: Aug. 30, 1994

[54] CAMERA WITH STROBE CAPABLE OF ADJUSTING LIGHT EMITTING AMOUNT
[75] Inventor: Hiroshi Takahashi, Hachioji, Japan
[73] Assignee: Konica Corporation, Tokyo, Japan
[21] Appl. No.: 134,678
[22] Filed: Oct. 12, 1993
[30] Foreign Application Priority Data
Nov. 9, 1992 [JP] Japan .................................. 4-323587
[51] Int. Cl.⁵ .......................... G03B 15/05; G03B 7/16
[52] U.S. Cl. .................................. 354/416; 354/419; 354/421; 354/422
[58] Field of Search ............... 354/416, 417, 419, 420, 354/421, 422, 423

[56] References Cited
U.S. PATENT DOCUMENTS

| 4,724,455 | 2/1988 | Suzuki et al. | 354/421 X |
| 4,899,191 | 2/1990 | Maruyama | 354/421 X |
| 5,017,955 | 5/1991 | Kotani | 354/419 X |
| 5,255,047 | 10/1993 | Ishimaru et al. | 354/416 |
| 5,257,063 | 10/1993 | Ishimaru et al. | 354/421 X |

FOREIGN PATENT DOCUMENTS
1-217443 8/1989 Japan .

OTHER PUBLICATIONS
English language abstract of Japanese Patent Publication Open to Public Inspection No. 1-217443, Aug. 1989.

Primary Examiner—W. B. Perkey
Attorney, Agent, or Firm—Finnegan, Henderson, Farabow, Garrett & Dunner

[57] ABSTRACT

A camera has a photomerry device to measure luminance of an object. The camera is provided with a strobe unit in which a strobe light is automatically emitted when the result of measurement by the photometry device is smaller than a predetermined luminance and an amount of light emission can be changed. The camera with the strobe unit includes a range finder to measure a distance of an object; a memory having a flashmatic calculation table in which F-number corresponding to the distance of the object are set according to a guide number which is used as a reference; a calculator in which a value of the guide number is changed according to a reference F-number in the flashmatic calculation table obtained by the measurement by the range finder and a desired F-number is found. The camera further includes a controller in which a strobe light is emitted by controlling the strobe unit by the desired F-number obtained by the calculation result of the calculator.

2 Claims, 10 Drawing Sheets

CAMERA WITH STROBE CAPABLE OF ADJUSTING LIGHT EMITTING AMOUNT

BACKGROUND OF THE INVENTION

The present invention relates to a camera with a strobe in which an amount of light emission can be changed.

In a conventional flashmatic system, photographing with a strobe has been carried out in the following manner: when a voltage of a capacitor for a strobe of the strobe unit is a predetermined value, charging for the capacitor is stopped so that an amount of strobe light emission becomes constant; and an amount of strobe light emission is adjusted by a diaphragm of a camera. This is due to the following reason: when the capacitor for a strobe of the strobe unit is charged to a predetermined voltage, and a period of time of strobe light emission is controlled, the relation between a period of time of strobe light emission and a guide number is absolutely determined. Accordingly, a control method, in which a period of time of strobe light emission is controlled so that light emission of a desired guide number can be obtained, is widely known.

Recently, a strobe light emission circuit in which a thyristor is replaced with an IGBT (Insulated Gate Bipolar Transistor) or the like, by which a period of time can be easily controlled, has been provided for the purpose of strobe light emission time control.

As described above, in the strobe unit in which an amount of strobe light emission can be controlled, for example, when the strobe unit, in which an amount of light emission can be changed, is used in the manner that it is combined with the diaphragm of the camera, the degree of freedom of photographic use is greater than a conventional constant amount of light emission.

In this case, for example, when flashmatic control is carried out, generally, an F-number table corresponding to the guide number is prepared, a subject distance is measured by a range finding means, and an amount of light emission is changed after a predetermined F-number has been found from the distance information by the measurement according to the F-number table.

However, when the guide number is changed two ways or more, capacity of a memory means in which the F-number table corresponding to the guide number is stored, is increased. Further, when a certain number of programs of a combination of the F-number with the guide number are programmed, new tables are necessary.

SUMMARY OF THE INVENTION

The object of the present invention is to provide a camera with a strobe unit in which capacity of the memory means is not increased, a complicated combination of F-numbers with guide numbers can be made, and in which the flashmatic control corresponding to the purpose of use can be easily accomplished.

A first embodiment of a camera with a strobe unit according to the present invention is accomplished by a camera provided with photomerry means to measure luminance of an object and a strobe unit in which a strobe light is automatically emitted when the result of measurement by the photomerry means is smaller than a predetermined luminance and an amount of light emission can be changed, the camera with the strobe unit comprising: a range finding means to measure an object distance; a memory means including a flashmatic calculation table in which F-numbers corresponding to the object distance are set according to a guide number which is used as a reference; a calculation means in which a value of the guide number is changed according to a reference F-number in the flashmatic calculation table obtained by the measurement by the range finding means and a predetermined F-number is found; and a control means in which a strobe light is emitted by controlling the strobe unit by the F-number obtained by the calculation result of the calculation means.

Further, in a second embodiment of a camera with a strobe unit according to the present invention, a unit amount of variation of the value of the guide number is set larger than that of the F-number.

In the first embodiment, the flashmatic calculation table, in which the reference F-number corresponding to the object distance is set according to the reference guide number, is prepared in advance; the value of the guide number is changed according to the reference F-number of the flashmatic calculation table obtained by the measurement of the range finding means so that a predetermined F-number is found; and the strobe unit is controlled by the F-number obtained by the result of the calculation so that the strobe light is emitted.

In the second embodiment, a unit amount of variation of the value of the guide number is larger than that of the F-number, and an amount of light emission is changed by a simple structure.

DETAILED DESCRIPTION OF THE PREFERRED EMBODIMENTS

Referring to the drawings, an example of a camera with a strobe unit of the present invention will be described in detail as follows.

Figure 1:
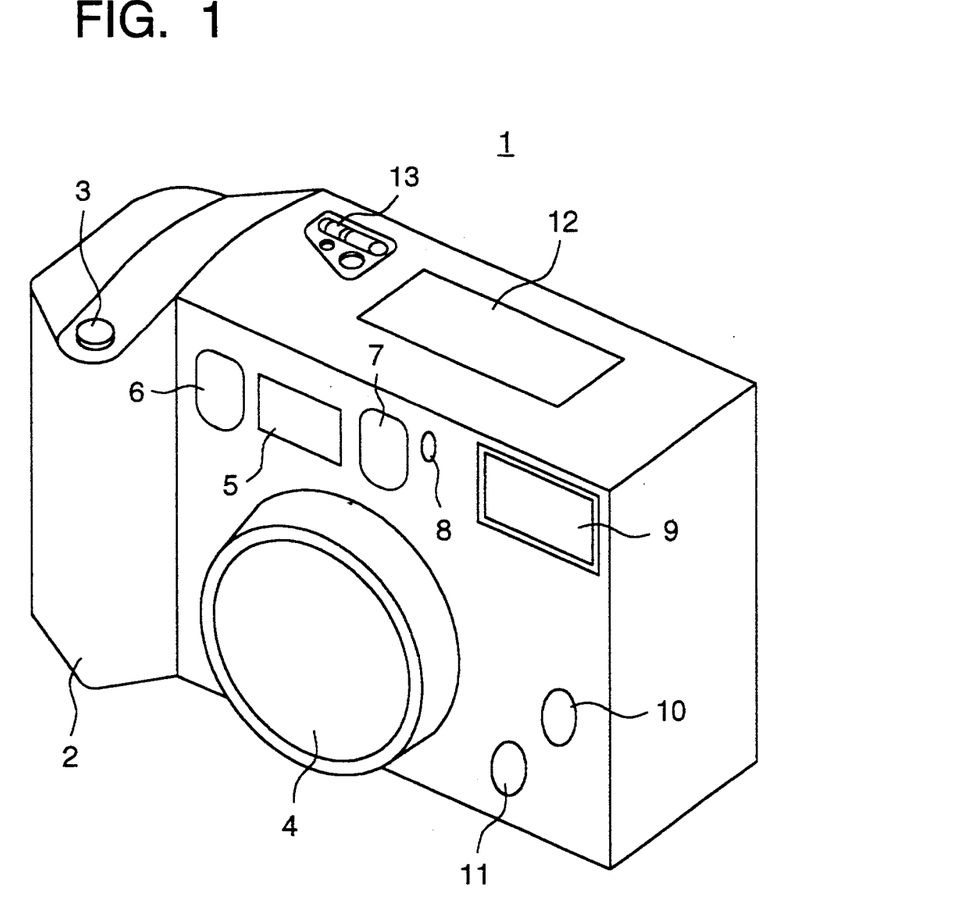
FIG. 1 is a perspective view of a camera.
Figure 2:
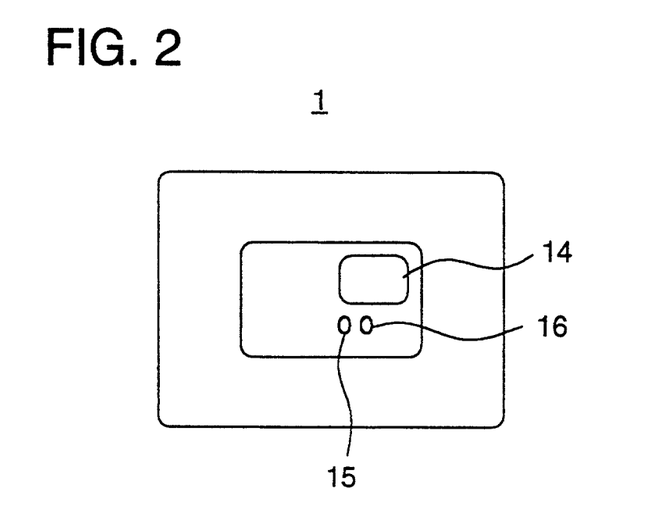
FIG. 2 is a rear view of the camera.
Figure 3:
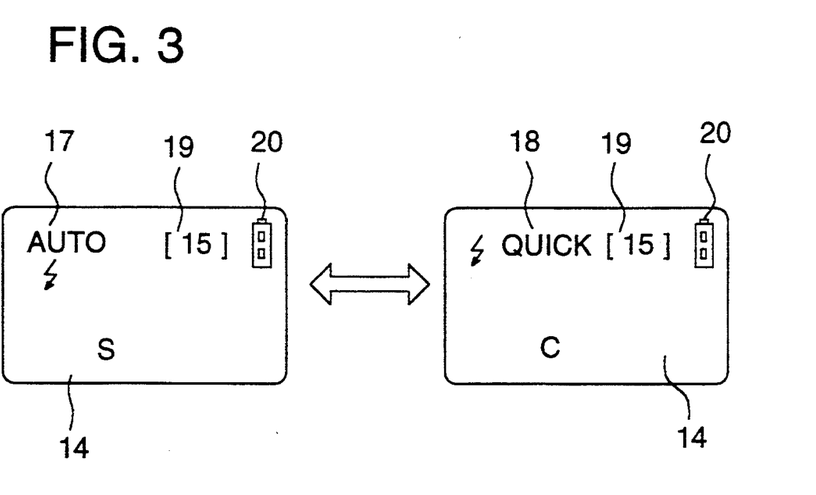
FIG. 3 is a view showing a display when continuous and single shot modes are respectively switched.
Figure 4:
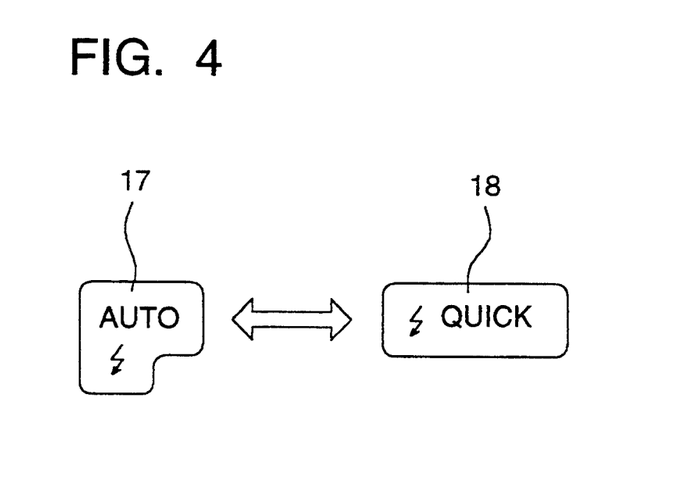
FIG. 4 is a view showing a display when a strobe mode is selected.

FIG. 1 through FIG. 4 show a camera with a strobe unit. FIG. 1 is a perspective view of the camera. FIG. 2 is a rear view of the camera. FIG. 3 is a view showing a display when continuous and single shots are respectively switched. FIG. 4 is a view showing a display when a strobe mode is selected.

In FIG. 1, numeral 1 is a camera with a strobe unit. A grip 2 is provided on the right side surface of the camera 1. A release button 3 is provided on the upper surface of the grip 2, and a zoom lens 4 is provided in the center of a front side of the camera 1. A viewfinder 5 is provided above the zoom lens 4. A light emitting window for automatic focusing is provided at one side of the viewfinder 5, and a light receiving window 7 is provided at the other side of the finder 5. A photometry window 8 for luminance photomerry of an object is provided at the side of the light receiving window 7, and a strobe light emission window 9 is provided at an upper portion of a left side of the camera 1.

A telescopic side zoom button 10 and a wide-angle side zoom button 11 are provided at the lower portion of the strobe light emission window 9 of the camera 1. A liquid crystal displaying unit 12 is provided at an upper portion of the camera 1, and a main switch 13 is provided at a right side of the liquid crystal displaying unit 12.

As shown in FIG. 2, a liquid crystal displaying unit 14 is provided on the rear surface of the camera 1, and a continuous/single shot switching button 15 and a strobe mode selection button 16 is provided under the liquid crystal displaying unit 14.

When this continuous/single shot switching button 15 is pressed, continuous and single shot modes are switched respectively. In the single shot mode in regular photographing, a character S is displayed in the liquid crystal displaying unit 14, and in the continuous shot mode, a character C is displayed in the unit 14.

When the strobe mode selection button 16 is pressed, a normal photographing mode and a quick charge photographing mode are switched respectively. In the normal photographing mode in regular photographing, a display 17 of characters AUTO is shown in the liquid crystal displaying unit 14, and in the quick charge photographing mode, a display 18 of characters QUICK is shown in the unit 14. Further, a counter to count the number of film frames 19 and a remaining battery capacity display 20 are provided in the liquid crystal displaying unit 14.

In the quick charge photographing mode, a smaller guide number side than that in the normal photographing mode is preferentially used in order to reduce the recycle time of the strobe unit.

Figure 5:
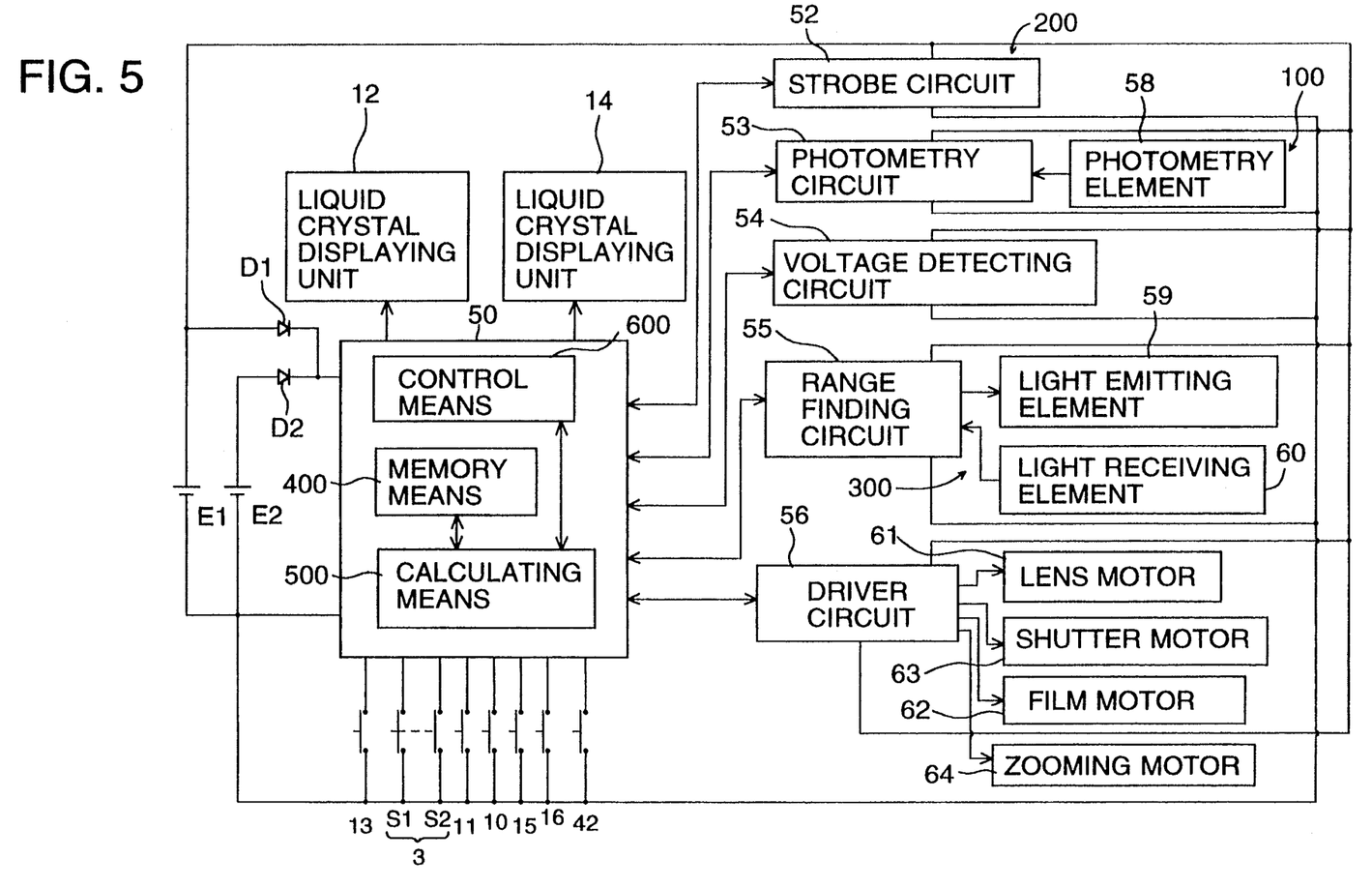
FIG. 5 is a control circuit diagram of the camera.

FIG. 5 is a control circuit diagram of the camera. A CPU 50 is provided in the control circuit of the camera. A power source for driving is given to the CPU 50 through a diode D1 from a main battery E1. Further, a diode D2 and a sub-battery E2 are connected in parallel with the main battery E1 and the diode D1, so that an auxiliary power source is given to the CPU 50.

The main switch 13, the release button 3, the telescopic side zoom button 10, the wide angle side zoom button 11, the continuous/single shot switching button 15, the flash mode selection button 16 and DX contacts 42 are connected with the CPU 50. The main switch 13 comprises a push button switch. The release button 3 comprises the first release switch S1 and the second release switch S2. The first release switch S1 is turned ON when the switch is pressed to a first step, and the second release switch S2 is turned ON when the switch is pressed to a second step. Further, the telescopic side zoom button 10, the wide angle side zoom button 11, the continuous/single shot switching button 15, the flash mode selection button 16, and the DX contacts are also composed of push buttons.

The CPU 50 is connected with the liquid crystal displaying unit 12 and the liquid crystal displaying unit 14, and further connected with a strobe circuit 52, a photometry circuit 53, a voltage detecting circuit 54, a range finding circuit 55 and a driver circuit 56. The voltage detecting circuit 54 detects a driving voltage which is supplied from the main battery E1 to the strobe circuit 52, photomerry circuit 53, range finding circuit 55, and driver circuit 56.

The strobe circuit 52 is operated by a trigger signal outputted from the CPU 50 and the strobe light is emitted. The strobe circuit 52 is charged by a charge signal outputted from the CPU 50. Photometry information is inputted from a photometry element 58 to the photomerry circuit 53. Film sensitivity information is inputted from a film sensitivity inputting means which is not shown in the drawings. An amount of exposure is set from this information, and shutter speed is determined.

In the range finding circuit 55, light is emitted from a light emitting element 59 by a range finding signal outputted from the CPU 50, and reflection light from a subject is received by a light receiving element 60 so that range finding operation is carried out. The driver circuit 56 drives a lens motor 61, a film motor 62, a shutter motor 63 and a zoom motor 64 according to a control signal outputted from the CPU 50.

In the driver circuit 56, the film motor 62 is driven in the same manner as the conventional one so that a film is wound and re-wound by the forward and backward rotation of the film motor 62. Alternatively, for example, as disclosed in Japanese Patent Publication Open to Public Inspection No. 217443/1989, the film motor may be rotated in one direction, and the rotational force is transmitted in the forward rotation and the reverse rotation by a power transmission device having a planetary gear so that a film can be fed. Film feeding is conducted in the following manner: the subsequent one frame of the film is wound by the film motor 62 after the preceding frame has been exposed; and the film is re-wound after all frames of the film have been exposed.

Figure 6:
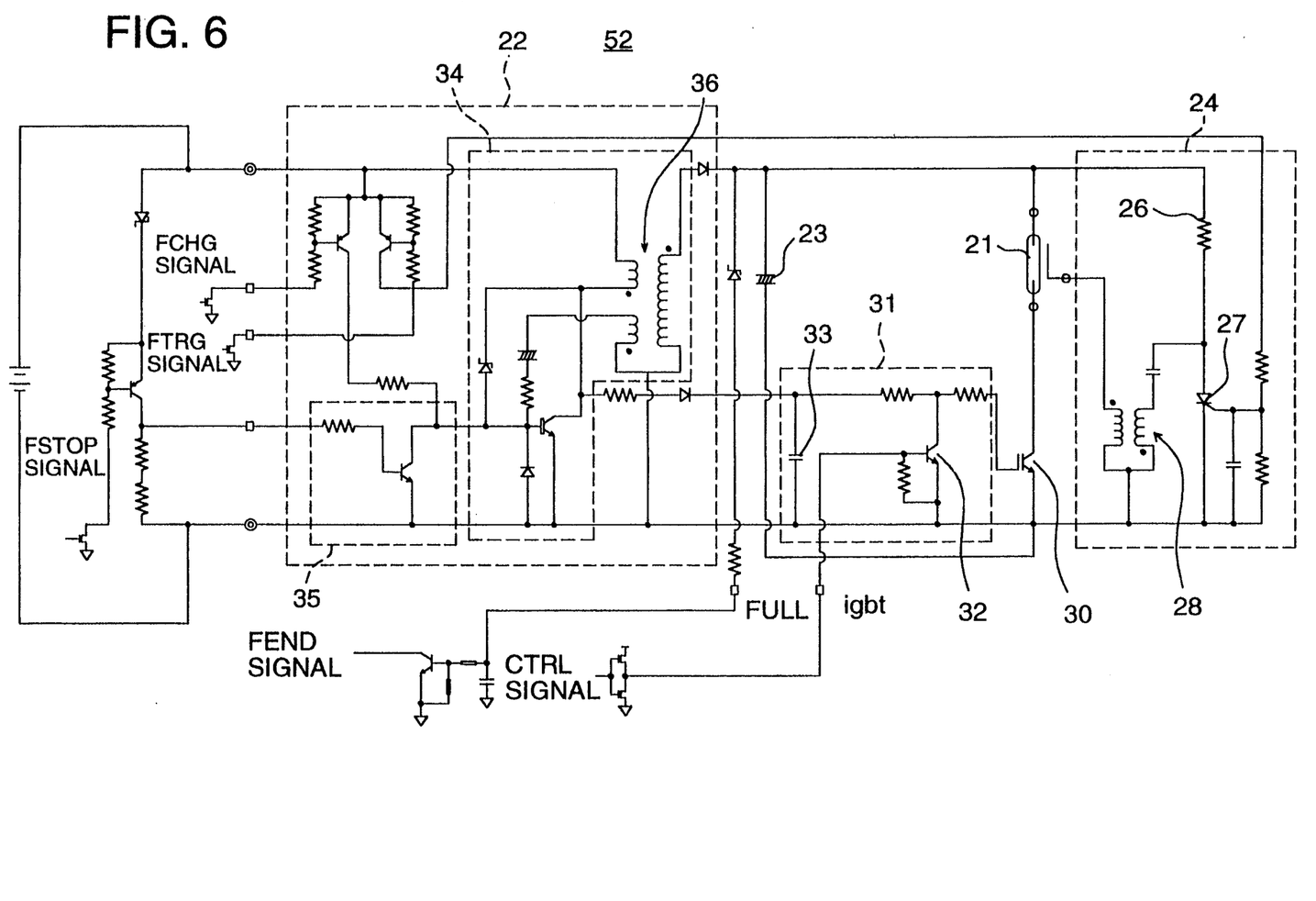
FIG. 6 is a strobe circuit diagram of a strobe unit.

Next, the strobe circuit 52 of the strobe unit of the camera is shown in FIG. 6. The strobe circuit 52 is connected with the CPU 50 of the camera, and is controlled by a signal outputted from the CPU 50. In the strobe circuit 52, a capacitor 23 of the strobe unit in which electric charges supplied from a step-up circuit 22 are accumulated, a light emission trigger circuit 24 which supplies an excitation voltage to an emission discharge tube 21, the emission discharge tube 21, and an IGBT 30 are connected with both ends of the step-up circuit 22 which supplies a high voltage necessary for discharging of the emission discharge tube 21. The light emission trigger circuit 24 has a resistor 26, a thyristor 27 for a light emission start trigger, and a trigger coil 28. A control circuit 31 is connected with a gate of the IGBT 30. A capacitor 33 to turn the IGBT 30 ON, and a transistor 32 to turn the IGBT 30 OFF are provided in the control circuit 31.

An oscillation voltage circuit 34, and a stop signal generation circuit 35 are provided in the step-up circuit 22. A transformer 36 is provided in the oscillation voltage circuit 34. A secondary output voltage of the transformer 36 charges the capacitor 23 for the strobe unit, and at the same time, a primary counter voltage is rectified. Then, a capacitor 33 in the control circuit 31 is charged, and the IGBT 30 is turned ON.

Figure 7:
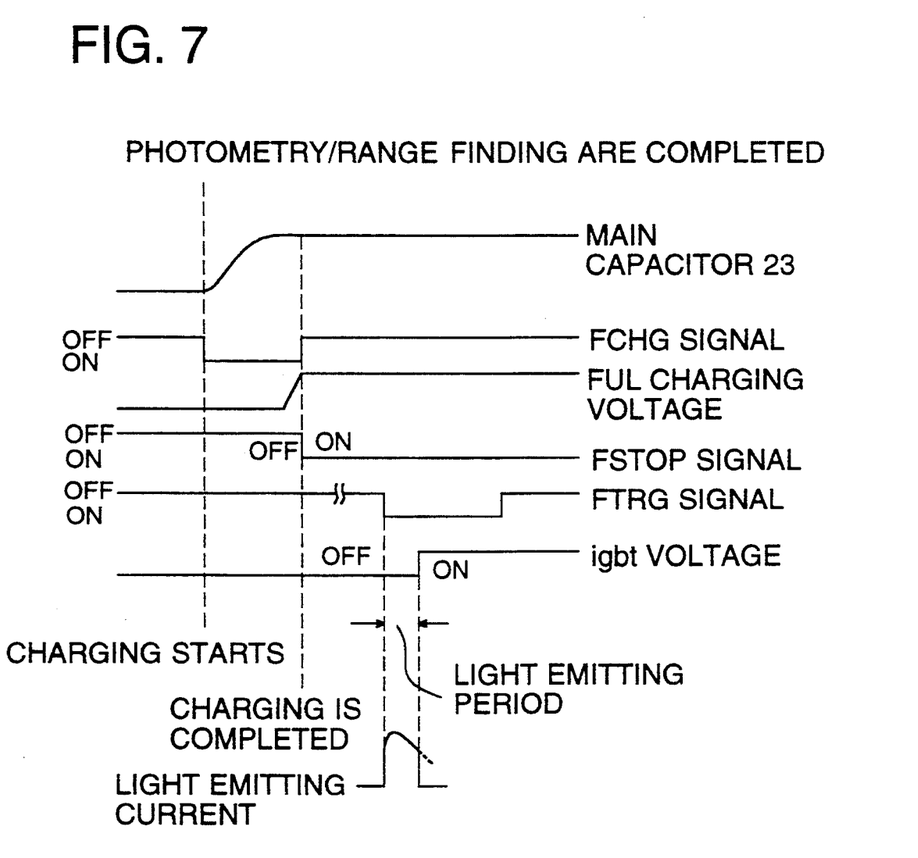
FIG. 7 is an operation timing chart of the strobe circuit.

Next, referring to a timing chart in FIG. 7, an operation of the strobe circuit 52 will be explained. When the first release switch S1 is turned ON and photometry and range finding operations are completed, an FCHG signal is turned ON. Due to the foregoing, the capacitor 23 in which electric charges for light emission are accumulated, and the capacitor 33 to turn the IGBT 30 ON, are charged by the step-up circuit 22.

When a regulated value of charging voltage for the capacitor 23 for the strobe unit is detected, and an FEND signal is turned ON, an FSTOP signal is turned ON, a stop signal generation circuit 35 is operated, and the charging operation by the oscillation circuit 34 is stopped.

After an FTRG signal is turned ON when the second release switch S2 is turned ON, and light emission is started by the thyristor 27 for light emission start trigger, when an igbt signal is turned ON at the timing of light adjusting, the transistor 32 in the control circuit 31 is turned ON, and thereby the IGBT 30 is turned OFF. Then, a light emission path of the light emission discharge tube 21 is interrupted, and thereby, light emission of the light emission discharge tube 21 is stopped.

Figure 8:
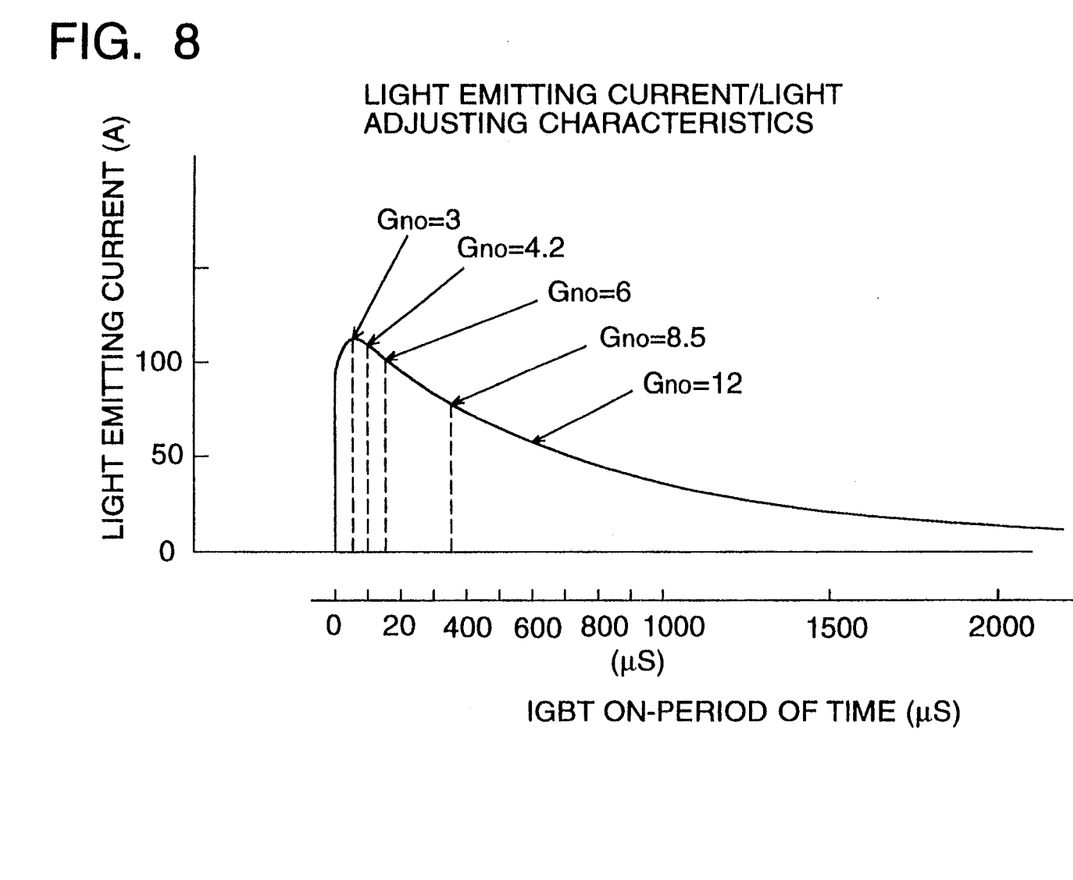
FIG. 8 is a view showing light emitting current/light adjusting characteristics of the strobe unit.
Figure 9:
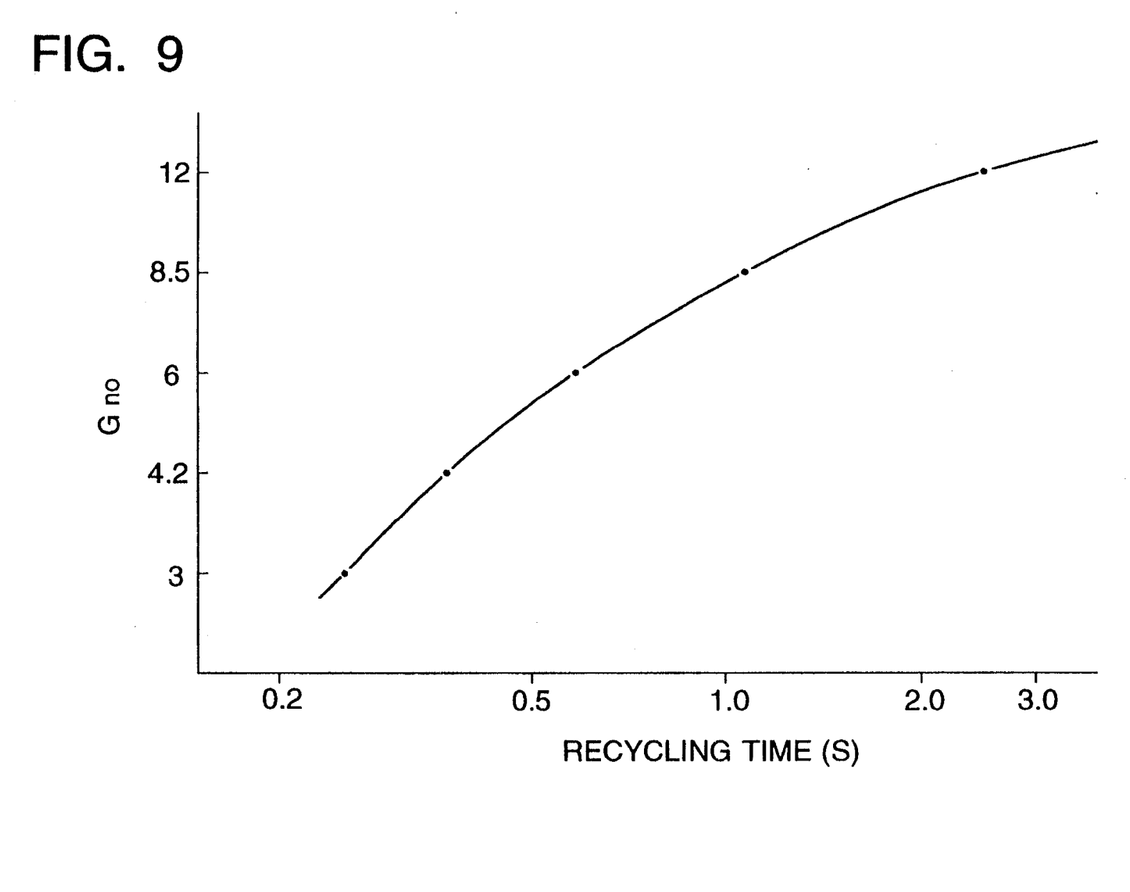
FIG. 9 is a view showing the recycle time of charging.

Setting of light adjusting timing after the start of the light emission will be described as follows. A guide number Gno of the camera with the strobe unit can be controlled in following five steps, for example, Gno is 3, 4.2, 6, 8.5, 12. Light emitting current/light adjusting characteristics of the strobe unit are shown in FIG. 8, and the recycle time for charging is shown in FIG. 9. As the guide number is increased from Gno 3 to Gno 12 in FIG. 8, the period of time during which the IGBT is ON is longer. As described in this example, when the IGBT is used, the IGBT is accurately turned OFF at a predetermined time, and a predetermined guide number can be obtained.

As the guide number is increased from Gno 3 to Gno 12 in FIG. 9, the recycle time is shorter. For example, in the continuous shot mode, the control in which the guide number is made small, and a time interval between photographing is shortened, can be realized.

As shown in the control circuit diagram of the camera in FIG. 5, the camera comprises: a photometry means 100 to measure the brightness of a subject; a strobe unit 200 which automatically emits strobe light and in which an amount of light emission can be changed when the result of the photometry by the photomerry means 100 is lower than a predetermined luminance; a range finding means 300 to measure the object distance; a memory means 400 having a flashmatic calculation table in which an F-number corresponding to the object distance is set according to a reference guide number; a calculating means 500 in which the value of the guide number is changed according to a reference F-number in the flashmatic calculation table obtained from measurement by the range finding means 300, and a predetermined F-number is obtained; and a control means 600 in which the strobe unit 200 is controlled by the F-number obtained from the calculation result of the calculating means 500 so that a strobe light is emitted.

Calculation by the calculating means 500 is carried out in the following manner. That is, the flashmatic calculation table stored in the memory means 400 comprises: [Table 1] a table of an F-number zone FMZ; [Table 2] a table of a film sensitivity zone DXZ; [Table 3] a table of a zoom zone ZMZ; and [Table 4] a table of a guide number zone GNZ, and those tables are shown below.

[Table 1] F-number zone FMZ table

The table of the F-number zone FMZ was prepared under the condition that the guide number Gno is 12, the film sensitivity is ISO 100, and a zoom lens is a wide angle lens.

TABLE 1

| Range to be measured (m) | Auto-focus (AF) zone | Fno | FMZ F-number (AV) |
| --- | --- | --- | --- |
| ∞ | 0 | 0 | — |
| 10 | 1 | 1.2 | 0.5 |
| 5 | 2 | 2.4 | 2.5 |
| 3.3 | 3 | 3.7 | 3.75 |
| 2.5 | 4 | 4.8 | 4.5 |
| 2 | 5 | 6.2 | 5.25 |
| 1.67 | 6 | 7.3 | 5.75 |
| 1.43 | 7 | 8 | 6 |
| 1.25 | 8 | 9.5 | 6.5 |
| 1.11 | 9 | 9.5 | 7 |
| 1 | 10 | 12.3 | 7.25 |
| 0.91 | 11 | 13.5 | 7.5 |
| 0.83 | 12 | 14.7 | 7.75 |
| 0.77 | 13 | 16 | 8 |
| 0.71 | 14 | 17.4 | 8.25 |
| 0.67 | 15 | 19 | 8.5 |

[Table 2] Film sensitivity zone DXZ table

The table of the film sensitivity zone DXZ is a table is which a film sensitivity SV is compensated by the film sensitivity ISO 100 so that it is zero.

TABLE 2

| Film sensitivity (ISO) | (SV) | DXZ |
| --- | --- | --- |
| 25 | 3 | −2 |
| 50 | 4 | −1 |
| 100 | 5 | 0 |
| 200 | 6 | 1 |
| 400 | 7 | 2 |
| 800 | 8 | 3 |
| 1600 | 9 | 4 |
| 3200 | 10 | 5 |

[Table 3] Zoom zone ZMZ table

The table of the zoom zone ZMZ is a table in which a wide angle lens is made a reference, and variations of an open aperture value accompanies with variations of the focal distance are converted into differences of exposure values EV.

TABLE 3

| ZOOM | ZMZ |
| --- | --- |
| WIDE | 0 |
| MID | 1 |
| TELE | 2 |

[Table 4] Guide number zone GNZ table

The table of the guide number zone GNZ is a table in which a reference guide number GNA 12 is made zero, and guide numbers are converted into differences of exposure values EV.

TABLE 4

| Gno | GNZ |
| --- | --- |
| 12 | 0 |
| 8.5 | 1 |
| 6 | 2 |
| 4.3 | 3 |
| 3 | 4 |

In calculation means 500, the guide number Gno and the F-number Fno are found by the following formula according to [Table 1] the table of F-number zone FMZ, [Table 2] the table of the film sensitivity zone DXZ, [Table 3] the table of the zoom zone ZMZ, [Table 4] the table of the guide number zone GNZ.

A predetermined F-number = FMZ + DXZ − ZMZ − GNZ

The F-number is inductively calculated when the guide number zone GNZ is changed until the F-number Fno reaches a predetermined target F-number. The guide number zone GNZ in the above formula is substituted by an initial value corresponding to a target program.

Figure 10:
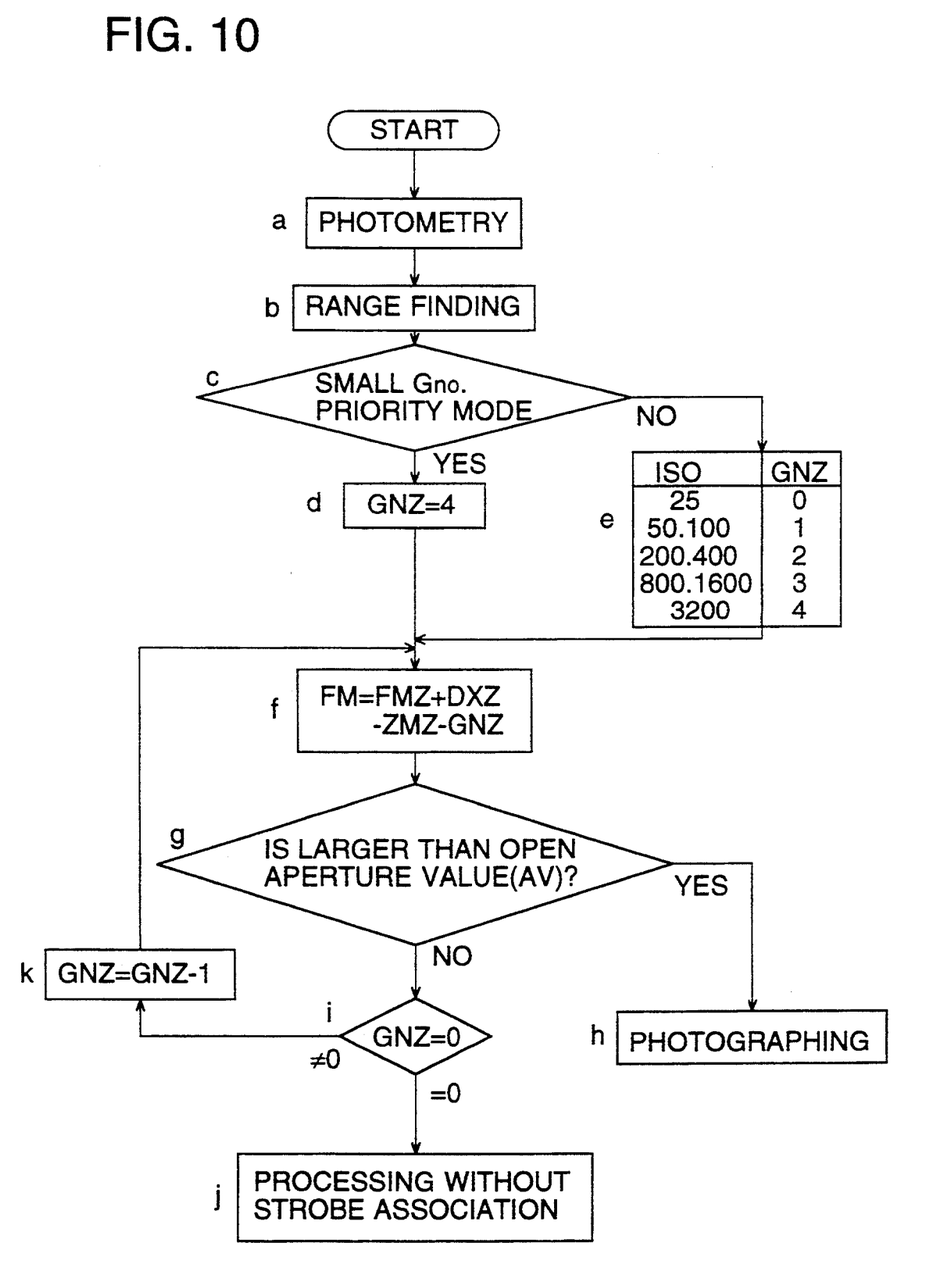
FIG. 10 is a flow chart of operations of the camera.

Next, operations to find the guide number Gno and the F-number Fno will be explained according to a flow chart in FIG. 10.

The range finding operation is carried out in step 'a', and the photometry operation is carried out in step 'b'. Next, in step 'c', whether the mode of the strobe unit is a small guide number priority mode or not, is judged. When the mode of the strobe unit is a small guide number priority mode, the minimum value of the guide number zone GNZ is set in step 'd' (GNZG=4). When the mode of the strobe unit is not a small guide number priority mode in step 'c', for example, when the film sensitivity is ISO 400, a predetermined guide number zone GNZ is initially set to 2 from the table of the guide number zone GNZ in table 4 in step 'e'.

The initial value of the guide number zone GNZ is set in the manner described above, and a predetermined F-number is found in step 'f' from the formula: a predetermined F-number $FM = FMZ + DXZ - ZMZ - GNZ$. In the formula, FMZ is substituted by a predetermined value from a range to be measured obtained in step 'a'. DXZ is substituted by a predetermined value obtained from the table of the film sensitivity zone DXZ in Table 2. ZMZ is substituted by a predetermined value from the table of the zoom zone ZMZ in Table 3. GNZ is substituted by a predetermined value obtained in step 'd' or step 'e'.

In step 'g', whether the result of the calculation is larger than an open aperture value (AV) or not is judged. When the result of the calculation is larger than the open aperture value (AV), photographing is carried out (step 'h'). When the result of the calculation is smaller than the open aperture value (AV), whether the guide number zone GNZ is [0] or not is judged in step 'i'. When the guide number zone GNZ is [0], processing without strobe association is carried out. When the guide number zone is not [0], the guide number zone GNZ is subtracted by [1] in step 'k', and the sequence advances to step 'f'. The same operations are repeated until the result of calculation is larger than the open aperture value (AV).

Figure 11:
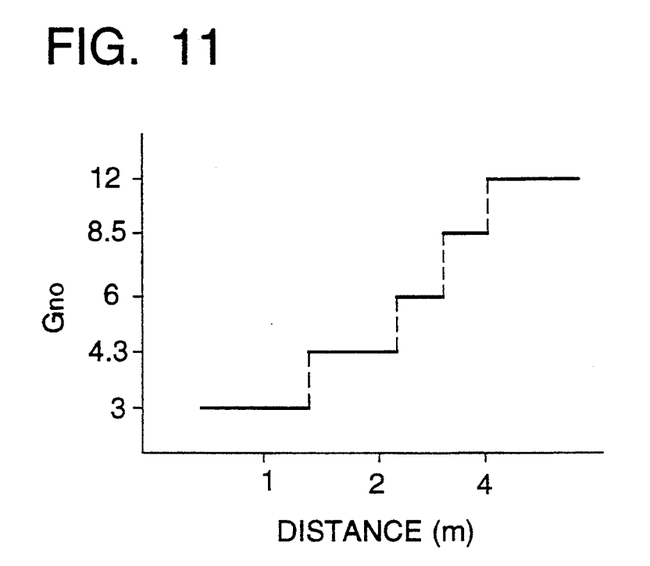
FIG. 11 is a view showing a guide number zone GNZ.
Figure 12:
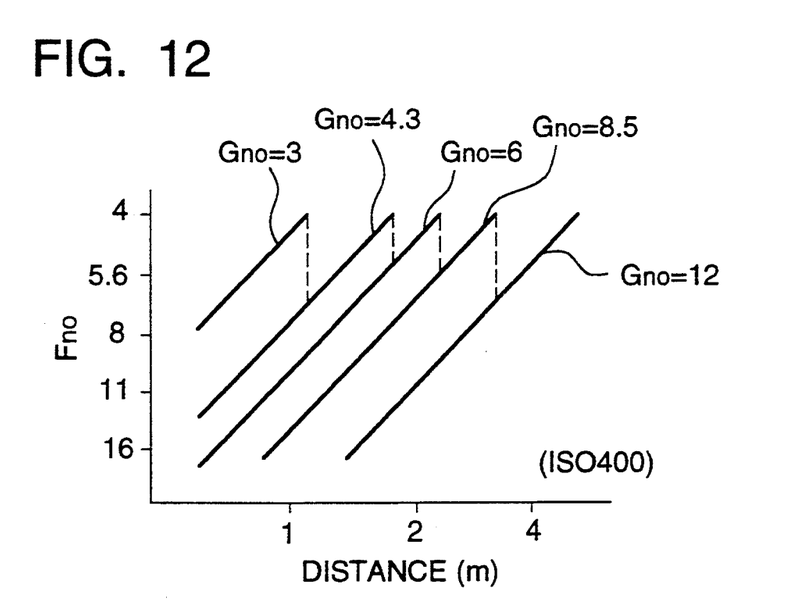
FIG. 12 is a view showing the relation between a guide number Gno and an F-number Fno.

From the result of the calculation, the relation between the distance and the guide number Gno is shown in FIG. 11. The relation between F-number Fno and the distance is shown in FIG. 12 corresponding to initial values of the guide number Gno.

When the combination of the F-number Fno with the guide number Gno is calculated, the guide number Gno is set to 1 EV step, and the F-number Fno is set to ¼ EV step. Further, the minimum units are set respectively so that an unit amount of variation of the guide number Gno is larger than that of the F-number Fno.

As described above, in the first embodiment according to the present invention, the flashmatic control can be easily accomplished in the following manner: a flashmatic calculation table, in which a reference F-number corresponding to the object distance is set according to a reference guide number, is prepared in advance; a predetermined F-number in the case where the guide number value is changed is found from the inductive calculation according to the reference F-number in a flashmatic calculation table obtained from the result of measurement by the range finding means; a strobe unit is controlled by the F-number obtained from the result of calculation and a strobe light is emitted; accordingly, the capacity of a memory means is not increased; and a complicate combination of the F-number with the guide number can be realized.

Further, in the second embodiment according to the present invention, a unit amount of variation of the value of the guide number is larger than that of the F-number, and therefore, an appropriate light amount of exposure can be obtained by a simple structure.

What is claimed is:

1. A camera comprising:
   (a) photometry means for measuring a luminance of an object;
   (b) a strobe unit capable of varying an amount of light emission thereof, for automatically emitting a flash light when the measured luminance is less than a predetermined luminance;
   (c) a range finding means for measuring a distance between an object and said camera;
   (d) a memory having a flashmatic calculation table in which F-numbers in accordance with a distance measured by said range finding means are set based on a reference guide number;
   (e) a calculating means for calculating a desired F-number by changing a guide number based on a reference F-number in said table obtained by measurement by said range finding means; and
   (f) control means for controlling an emission of the strobe light of said strobe unit, based on the desired F-number calculated by said calculating means.

2. The camera of claim 1, wherein a unit amount of variation of the value of said guide number is set greater than that of said F-number.

* * * * *

UNITED STATES PATENT AND TRADEMARK OFFICE
CERTIFICATE OF CORRECTION

PATENT NO. : 5,343,268
DATED : August 30, 1994
INVENTOR(S) : Hiroshi TAKAHASHI

It is certified that error appears in the above-indentified patent and that said Letters Patent is hereby corrected as shown below:

Abstract, title Page, Line 1 change "photomerry" to --photometry--.

Signed and Sealed this

Twenty-eight Day of March, 1995

Attest:

BRUCE LEHMAN

Attesting Officer

Commissioner of Patents and Trademarks